US011539806B2

United States Patent
Rizvi et al.

(10) Patent No.: US 11,539,806 B2
(45) Date of Patent: *Dec. 27, 2022

(54) SERVER-SIDE CONFIGURATION VARIABLES IN FEATURE TESTING

(71) Applicant: Optimizely, Inc., San Francisco, CA (US)

(72) Inventors: Ali Abbas Rizvi, San Francisco, CA (US); Michael J. Connolly, Jr., San Francisco, CA (US); John Provine, Palo Alto, CA (US)

(73) Assignee: OPTIMIZELY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,501

(22) Filed: Aug. 16, 2021

(65) Prior Publication Data

US 2021/0377352 A1 Dec. 2, 2021

Related U.S. Application Data

(63) Continuation of application No. 16/290,637, filed on Mar. 1, 2019, now Pat. No. 11,108,875.

(Continued)

(51) Int. Cl.
*H04L 67/141* (2022.01)
*G06F 40/197* (2020.01)
(Continued)

(52) U.S. Cl.
CPC ............ *H04L 67/53* (2022.05); *G06F 40/197* (2020.01); *H04L 67/141* (2013.01); *H04L 67/52* (2022.05)

(58) Field of Classification Search
None
See application file for complete search history.

(56) References Cited

U.S. PATENT DOCUMENTS 8,166,155 B1   4/2012  Rachmeler et al.
8,583,766 B2 * 11/2013  Dixon ................... G06Q 30/02
                                                     705/7.29

(Continued)

OTHER PUBLICATIONS

Baker, "Launched: Enterprise Feature Flag Management", https://blog.launchdarkly.com/launched-enterprise-feature-flag-management/, Sep. 28, 2016, 5 pages.

(Continued)

*Primary Examiner* — Mohamed Ibrahim
(74) *Attorney, Agent, or Firm* — Womble Bond Dickinson (US) LLP

(57) ABSTRACT

A method includes receiving an identification of a feature associated with digital content of a third-party content provider, wherein the identification comprises a feature variable placeholder associated with the feature. The method further includes receiving a configuration of a feature flag associated with the feature. The method further includes determining, by a processing device of an experimentation system, a plurality of feature variable values corresponding to the feature variable placeholder. The method further includes configuring, by the processing device, one or more rules on the experimentation system to determine: when and to whom the feature is to be deployed, based on the feature flag; and which of the plurality of feature variable values is to be deployed when and to whom.

20 Claims, 14 Drawing Sheets

Related U.S. Application Data

(60) Provisional application No. 62/746,990, filed on Oct. 17, 2018.

(51) Int. Cl.
*H04L 67/53* (2022.01)
*H04L 67/52* (2022.01)

(56) References Cited

U.S. PATENT DOCUMENTS

| | | | |
|---|---|---|---|
| 8,775,603 B2 * | 7/2014 | Hansen | H04L 67/28 709/224 |
| 2013/0151949 A1 * | 6/2013 | Miller | G06F 16/958 715/234 |
| 2013/0287305 A1 | 10/2013 | Dhanda et al. | |
| 2016/0063282 A1 | 3/2016 | Shani et al. | |
| 2016/0124839 A1 | 5/2016 | Mordo et al. | |
| 2018/0322032 A1 | 11/2018 | Thazhathekalam et al. | |

OTHER PUBLICATIONS

"Creating a Feature Flag", https://docs.launchdarkly.com/v2.0/docs/creating-a-feature-flag, downloaded on Mar. 1, 2019, 6 pages.
"The dashboard", https://docs.launchdarkly.com/v2.0/docs/the-dashboard, downloaded on Mar. 1, 2019, 3 pages.
"The kill switch", https://docs.launchdarkly.com/v2.0/docs/the-kill-switch, downloaded on Mar. 1, 2019, 3 pages.
"Targeting users", https://docs.launchdarkly.com/v2.0/docs/targeting-users, downloaded on Mar. 1, 2019, 8 pages.
"Running A/B tests", https://docs.launchdarkly.com/v2.0/docs/running-ab-tests, downloaded on Mar. 1, 2019, 6 pages.

\* cited by examiner

FIG. 3M

Feature Key

Use this to uniquely identify the feature.

test-key

Description

What does this feature do?

this is a test

Experiments

This feature is currently in 1 experiment.

| Experiment  339 | Type  340 | Status  341 |
|---|---|---|
| test-key_test | Feature Test | Draft |

Rollout

0%                                                      100%

SERVER-SIDE CONFIGURATION VARIABLES IN FEATURE TESTING

CROSS-REFERENCE TO RELATED APPLICATIONS

This application is a continuation of U.S. patent application Ser. No. 16/290,637, filed Mar. 1, 2019, which claims the benefit of U.S. Provisional Patent Application No. 62/746,990, filed Oct. 17, 2018, the entire contents of which are hereby incorporated by reference.

FIELD OF TECHNOLOGY

The embodiments described herein pertain in general to conducting experiments on a web page or digital product and more particularly to using server-side configuration variables in feature testing on web pages or digital products.

BACKGROUND

Content variation testing is an experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations are measured (for example, whether a user clicks through a button or a variation of a button), and the changes to a web page (or its elements) that produce positive or negative results are determined. The positive results associated with a particular change to a web page validates that the change to the web page should be used in a production version of the web page.

BRIEF DESCRIPTION OF THE DRAWINGS

FIGS. 3K-N are user interfaces for experimenting on features, according to one embodiment.

DETAILED DESCRIPTION

Product development teams may run A/B tests to answer specific questions regarding which version of a web page or digital product (including various features) are more successful. In some embodiments, the process of developing a product is does not lend itself well to a simple A/B test. Where A/B tests have a clear beginning and end, the development of a new feature may not. In many instances feature development may be imprecise—e.g., a development team might start by launching a barebones prototype, then run experiments to collect data and iterate towards perfection. Throughout the development process, various gaps in the process of developing, deploying, and making decisions about features may exist, which may reduce the efficiency and accuracy of development software and the computer systems on which it runs.

For example, traditional testing platforms may not provide efficient solutions pertaining to deploying features to some users and not others, toggling features on and off, gradually rolling out features to users, A/B testing features, targeting features to specific users, remotely configuring features without deploying new code, etc. Advantageously, the embodiments described herein provide efficient solutions to the above, and other, problems by providing for server-side configuration variables that are capable of being activated and deactivated with a variety of values without code redeployment. As described herein, a feature is any element, or combination of elements, of a web page or other digital product that may be provided to a client device.

Advantageously, the embodiments described herein allow for defining and deploying a feature once, then toggling the feature on or off remotely, running experiments to collect data to understand whether a new feature works (e.g., via A/B tests on features and gradual rollouts of features to users), and effectively managing features to ensure they are working as expected. It should be noted that server-side configuration variables are also referred to herein as feature variables, merely for convenience and brevity.

Figure 1:
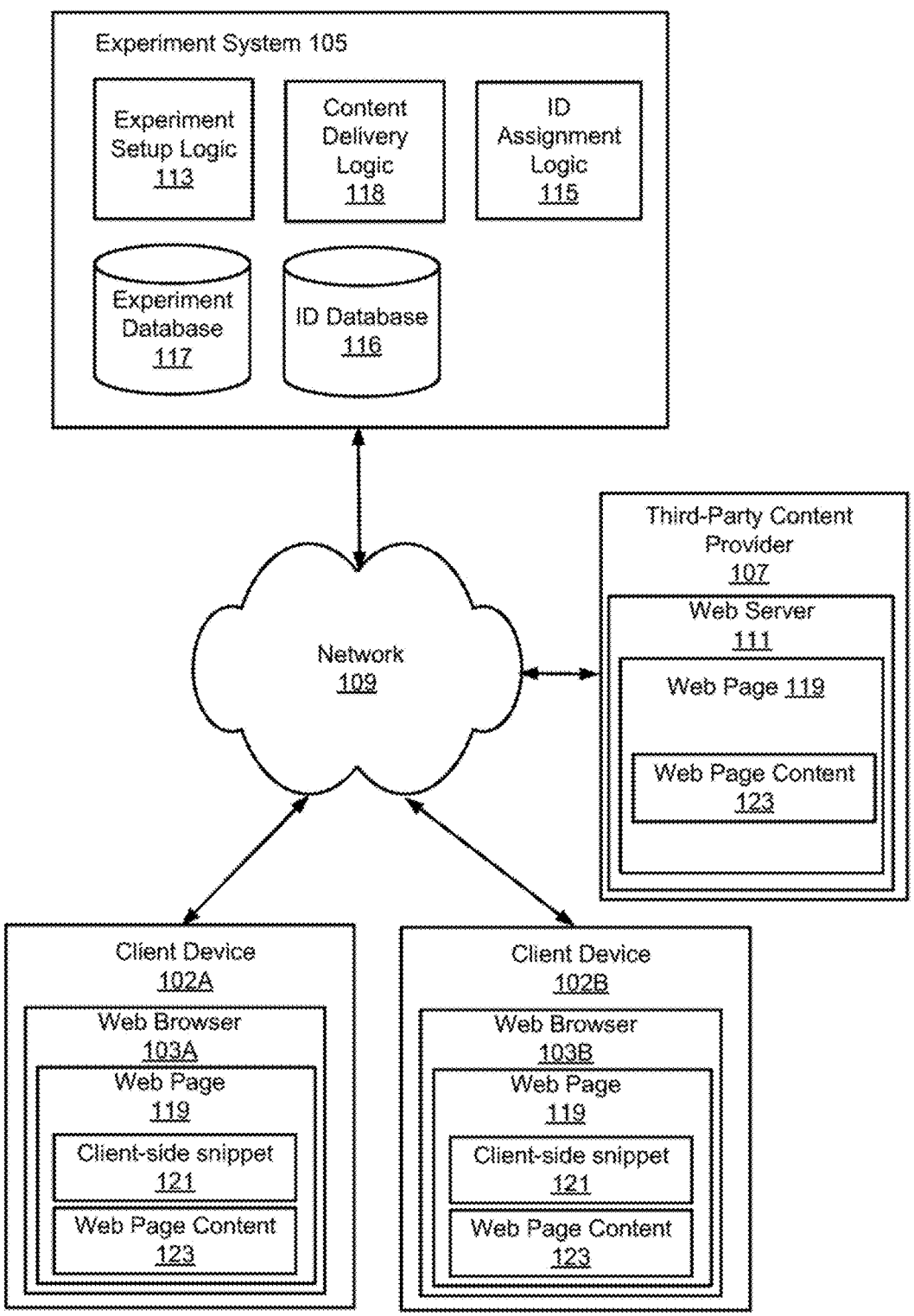
FIG. 1 is a block diagram of a variant testing system environment, according to one embodiment.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. Although the environment 100 shown in FIG. 1 only includes two client devices 102, the environment 100 can include any number of client devices (e.g., thousands of client devices 102).

FIG. 1 and the other figures may use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 may communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the third-party content provider 107.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 include web pages. However, the content provider 107 may provide other types of content items (e.g., digital content) such as software applications, including web applications, mobile device applications, etc.). The web pages and software applications may include video, audio, a combination of video and audio, still images (e.g., JPEG), text documents, advertisements, and/or any other types of content. For purposes of convenience and the description of one embodiment, the content items provided by the content provider 107 will be referred to as a web pages, but no limitation on the type of content items are intended by this terminology.

In one embodiment, the content provider 107 operates in conjunction with the experiment system 105 to perform variation testing on web pages. The content provider 107 may display different variations of a web page, including different features, to client devices 102 based on instructions from the experiment system 105 that is conducting a variation test on the web page for the content provider 107. A variation test for a web page may test changes to the web page against the current variation of the web page to determine how the variation alters user interaction, or some other metric, with the web page or whether the changes produce a desired result. An example of a desired result resulting from a change to a web page is an increased selection of an advertisement(s) included in the web page or increased purchases of a product advertised on a web page. Thus, variation testing validates a new design of a web page or changes on elements on the web page before the new design or changes are put into production by the content provider 107.

For a given web page, the content provider 107 may have one or more variations of the web page that are used in a variation test for the web page. In one embodiment, a variation test of a web page involves an experiment that tests an "A" variation known as the control and a "B" variation known as the variant on users requesting the web page from the content provider 107. For ease of discussion, the embodiments discussed herein describe a web page having only two variations: the control and the variant. However, in other embodiments, a web page can have any number of variants.

Figure 2B:
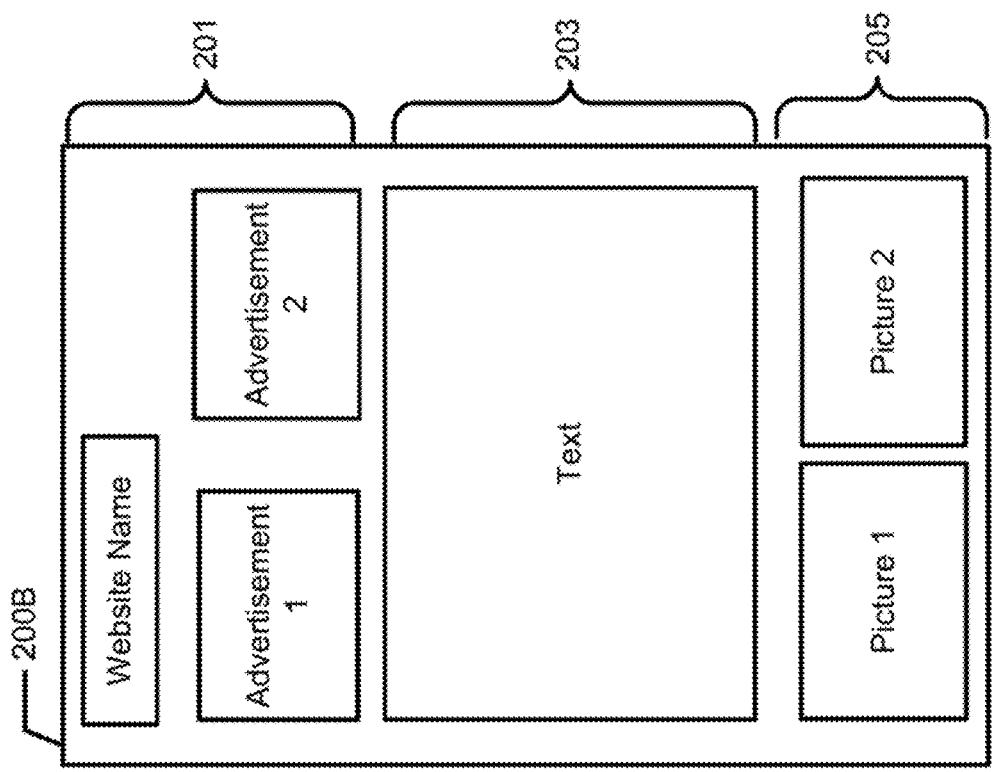
FIGS. 2A and 2B are example variations of a web page, according to one embodiment.
Figure 2A:
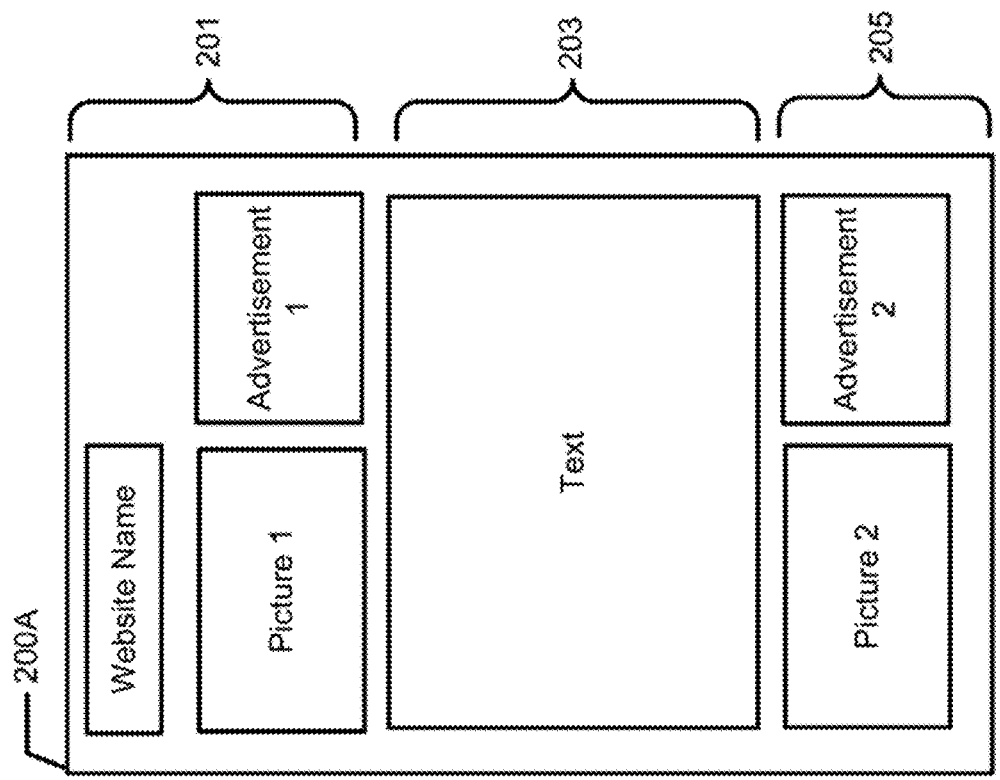

FIG. 2A is an example of an "A" variation (e.g., the control variation) of a web page 200A that represents the current implementation of the web page provided by content provider 107. The control variation of the web page 200A includes a website name of the website associated with the web page, a first picture, and a first advertisement. The website name, the first picture, and the first advertisement are located in an upper portion 201 of the control variation of web page 200A according to one embodiment. The control variation of web page 200A also includes textual content located in a central portion 203 of the control variation of web page 200A and the control variation of the web page 200A also includes a second picture and a second advertisement located at a lower portion 205 of the control variation of the web page 200A.

FIG. 2B is an example of a "B" variation (e.g., the variant version) of a web page e 200B. The variant version of the web page represented by web page 200B includes a change (i.e., a modification) to the control version of the web page 200A shown in FIG. 2A. The variant version of web page 200B includes the website name, a first advertisement, a second advertisement, textual content, a first picture, and a second picture similar to the control version of the web page 200A shown in FIG. 2A. However, the variant version of web page 200B includes the second advertisement positioned in the upper portion 201 of web page 200B whereas the second advertisement is positioned in the lower portion 205 in the control version of the web page 200A. In one embodiment, the variation test using the control version and the variant version of the web page is conducted to determine whether the second advertisement receives more selections when the second advertisement is located at the lower portion 205 of the web page as shown in FIG. 2A or when the second advertisement is located at the upper portion 201 of the web page as shown in FIG. 2B.

Referring back to FIG. 1, in one embodiment the content provider 107 includes a web server 111, web page 119, and web page content 123. The experiment system 105 includes experiment setup logic 113, content delivery logic 118, identification (ID) assignment logic 115, an ID database 116, and an experiment database 117. As is known in the art, the term "logic" refers to computer program logic utilized to provide the specified functionality. Thus, logic can be implemented in hardware, firmware, and/or software. In one embodiment, program logic is stored on a non-transitory storage device (i.e., a computer program product), loaded into a memory, and executed by one or more computer processors. Additionally, those of skill in the art will recognize that other embodiments of the content provider 107 shown in FIG. 1 can have different and/or other logic than that described here, and that the functionalities can be distributed among the logic in a different manner.

In one embodiment, the experiment database 117 stores multiple (i.e., a plurality) variation testing records that describe variation tests conducted by the experiment system 105. Each variation test record is associated with a web page (e.g., whether a static web page or a web page), an experiment identifier unique to the variation test, and identifiers of different variations (e.g., having different features) of a web page involved in the variation test. A variation test record may also include a description of the change(s) made to each variation of the web page compared to the control variation of the web page.

In one embodiment, the web server 109 links the content provider 107 to one or more client devices 102 and the experiment system 105 via the network 109. The web server 111 serves content items such as web pages, as well as other web related content, such as Java, Flash, XML, and so forth. The web server 111 may include a mail server or other messaging functionality for receiving and routing messages between the experiment system 105 and one or more client devices 102.

In one embodiment, the identification (ID) assignment logic 115 generates user identifiers for users of client devices 102. In one embodiment, the user identifier is used by the user of a client device 102 to log into a web page or application provided by the content provider 107. In one embodiment, a user identifier is a string of numbers that is unique to a particular client device 102. Thus, client device 102A may have a different user identifier than the user identifier for client device 102B. In one embodiment, the ID assignment logic 115 generates a user identifier by automatically incrementing the value of the last user identifier generated by the ID assignment logic 115 using an auto increment function. Alternatively, the ID assignment logic 115 generates a unique random number and assigns the unique random number as a user identifier for a client device 102. In another embodiment, the ID assignment logic 115 may receive a user identifier from a client device 102. The user identifier received from the client device 102 may be generated by the client device 102 or by the client loaded on the web page of the client device, or the user identifier may be input by the user into the client device 102. The ID assignment logic 115 may store user identifiers in the ID database 116 that maintains a record of all assigned user identifiers.

In one embodiment, responsive to the content provider 107 receiving a request for a web page from a client device, the ID assignment logic 115 communicates with the client device 102 to determine whether the client device 102 already has a user identifier. For example, the ID assignment logic 115 may query the client device 102 to transmit the user identifier via a login form displayed on the web page. In another example, the ID assignment logic 115 queries the client device 102 to determine whether the client device 102 includes a stored cookie that comprises a user identifier for the client device 102. If the client device 102 lacks a cookie with a user identifier for the client device 102, the ID assignment logic 115 may query the client device 102 to transmit the user identifier via a login form displayed on the web page. Alternatively, the ID assignment logic 115 generates a user identifier for the client device 102 and communicates the user identifier to the client device 102 for storage in a cookie at the client device 102 if the client device 102 lacks a cookie with a user identifier. Alternatively, the client loaded on the webpage generates a cookie containing a randomly generated user identifier and sends this user identifier to assignment logic 115. The client device 102 may continue to use the user identifier generated by the ID assignment logic 115 for subsequent requests for the web page.

Figure 3A:
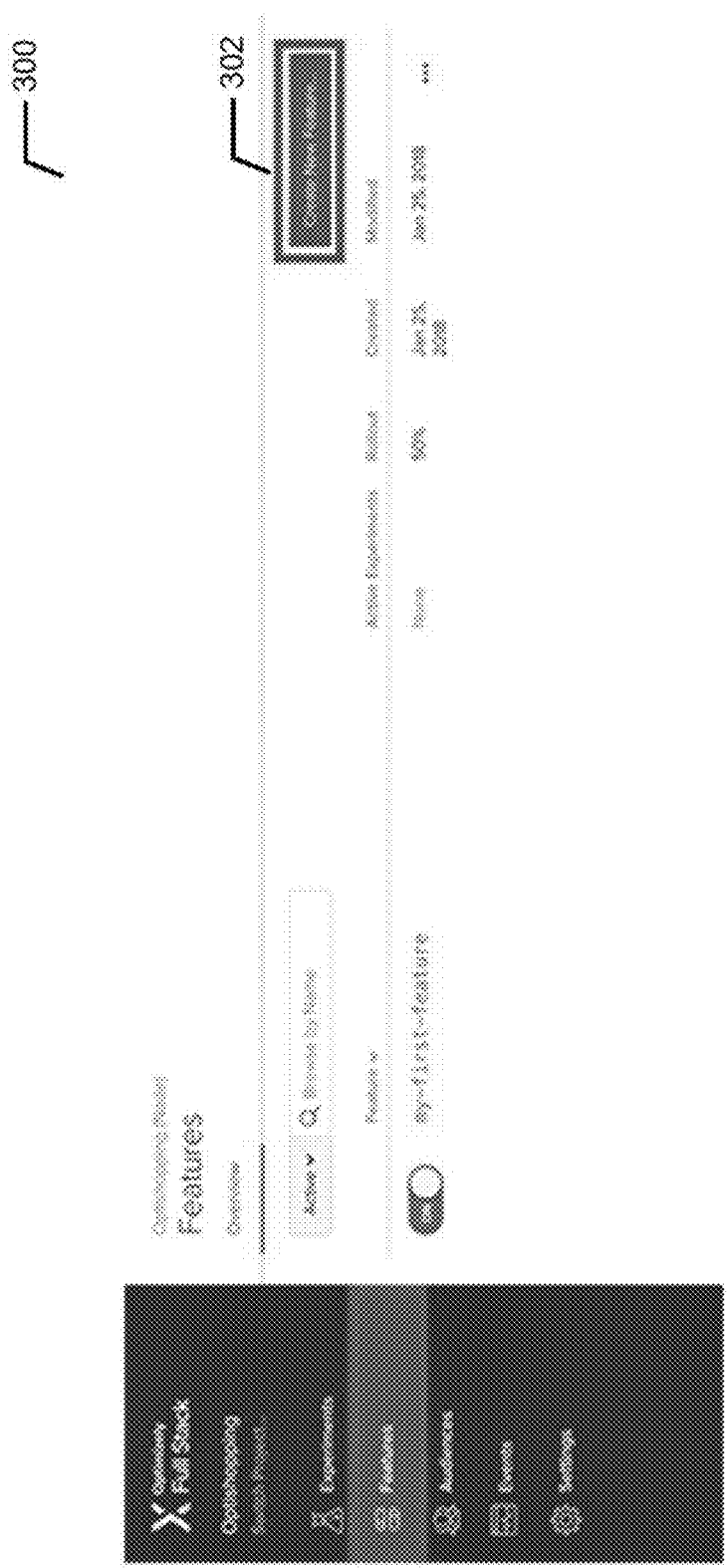
FIGS. 3A-D are user interfaces for creating, configuring, and rolling out a new feature, according to one embodiment.

FIG. 3A is a user interface of configuring a new feature flag on the experiment system, according to one embodiment. In one embodiment, GUI 301 allows users to configure new feature flags by navigating to the features tab and clicking the "Create New Feature" button 302. In one embodiment, once button 302 is activated, the system provides a second GUI 303 of FIG. 3B to a client device connecting to the experiment system. GUI 303 may illustrate a new feature form, which may allow a user to specify a unique feature key 304. In one embodiment, feature key 304 is a unique identifier (ID) that an engineer, or a computer system, may use to determine whether a particular feature is on or off when a program runs.

Figure 3B:
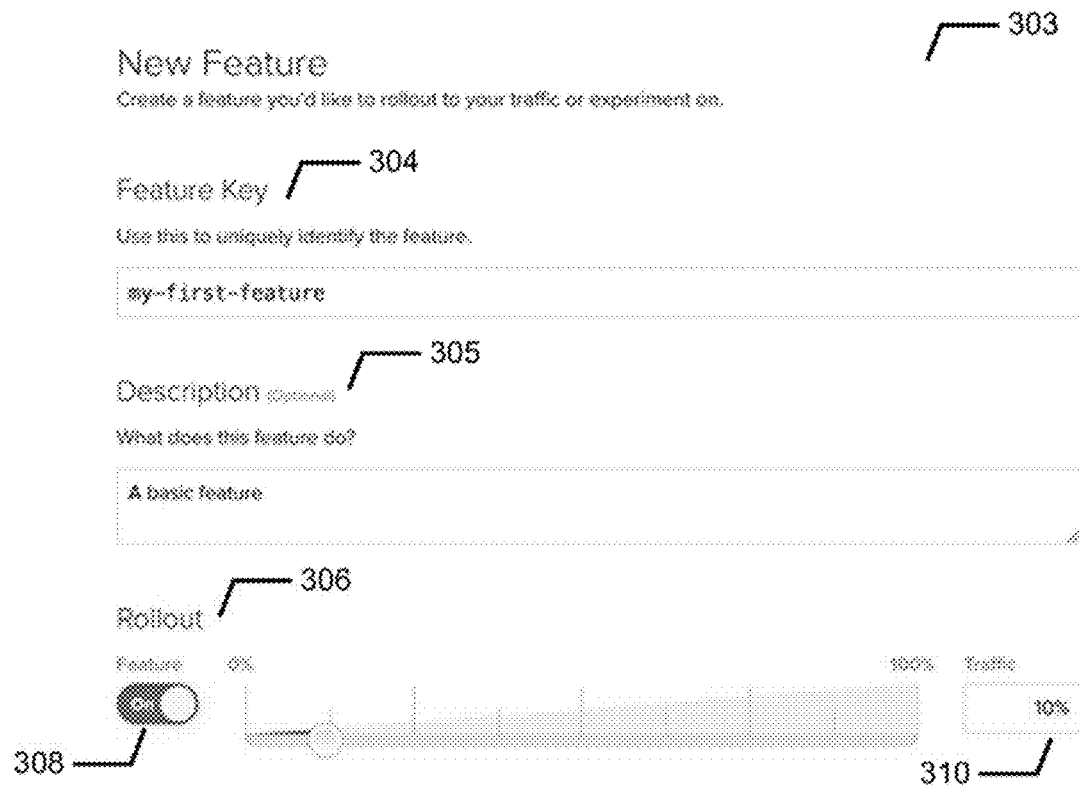

In one embodiment, GUI 303 may allow users to provide an optional description 305, to provide context about the purpose of the feature. The feature form (e.g., 303) may include the ability to define a feature rollout 306. In one embodiment, a feature rollout may be the ability to turn a feature on and to specify the percentage of traffic (e.g., network traffic) for which a feature is enabled. In one embodiment, new feature rollouts may default to "off" with 0% of traffic allocated. As shown in FIG. 3B, in one embodiment, to turn on a feature, a user may set the feature toggle 308 to "on" and set a traffic allocation 310. If a rollout is toggled on for a traffic percentage, then toggled off, then later toggled back on, the rollout may retain the traffic percentage previously defined.

In one embodiment, to determine rollout eligibility, a system may combine a user ID with a unique rollout ID and compute a deterministic hash that outputs a number between 0 and 10,000, for example (any other number may be used). If that number falls within the range specified by the feature rollout's traffic allocation, the visitor may eligible for a given Feature. In another embodiment, rollouts may also include audience targeting, which may be evaluated before the rollout traffic allocation. And, if there is a feature test running at the same time as the feature rollout, the feature test takes may take precedence over the rollout. Both embodiments are covered in more detail herein.

In one embodiment, users may be able to specify whether a rollout is toggled on or off and are be able to specify traffic allocation at the environment level. This may provide support for a variety of use cases, such as setting a feature to 100% of traffic in a pre-production environment while the feature is only exposed to a small percentage of production traffic. In one embodiment, rollouts may be targeted to specific audiences.

In one embodiment, after defining or changing a rollout, users confirm changes by activating a "Create"/"Save" element on the feature form. If a rollout is enabled for a nonzero percentage of traffic, activating "Create" or "Save" on the feature form launches the rollout.

Figure 3C:

In one embodiment, a feature dashboard 311 of FIG. 3C provides a snapshot of what is happening to a feature at a given point in time to clearly communicate what is happening and to facilitate easy paths to action. The feature dashboard 311 may include the following columns, in one example:

Active Experiments—Lists all active (running or paused) Feature Tests and/or MVTs on each Feature; if there are >2 active experiments, we'll follow the pattern that we use for Environments—show the most recent and the collapse the others as "Other Experiments (N)"

Rollout—If there is an active Rollout running in the Production Environment, this shows the traffic allocation of that Rollout; if the Feature is off in production, this reads "Off"

Environment—Same component that is used on the Experiments Dashboard; shows Production Environment status and then other Environments rolled up Created—Date Feature was created Modified—Date Feature/Rollout was last modified In one embodiment, users can take action directly from the feature dashboard 311 by clicking the ellipses 312 on the right hand side. Doing so may open a menu that includes environment-specific toggles, which may be analogous to environment-specific status buttons available on the experiments tab. In one embodiment, changing a toggle from the feature dashboard 311 may trigger a popup prompting the user to confirm any changes.

Figure 3D:
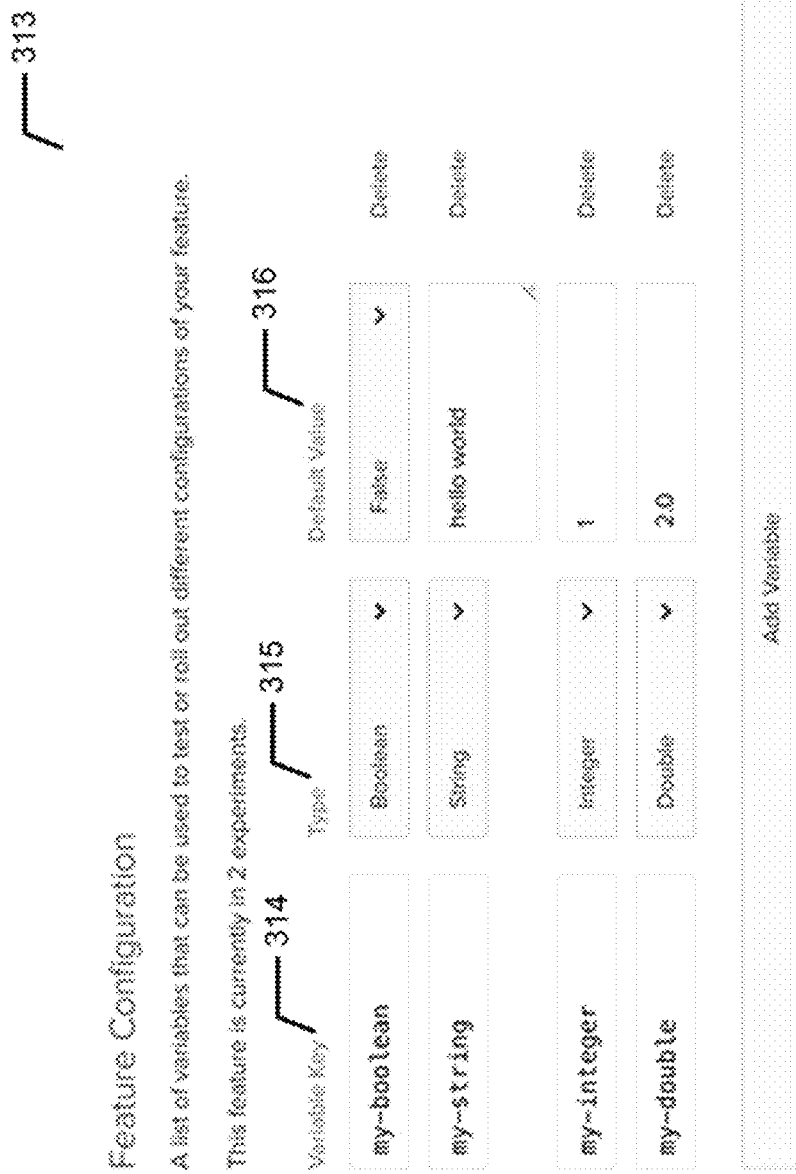

In one embodiment, GUI 313 of FIG. 3D provides the option to define a feature configuration, which may be a set of one or more feature variables (e.g., server-side configuration variables) that users can use to make a feature more powerful. In one embodiment, feature configuration allows users to change the values of the variables (e.g., feature variable values) they define without deploying code.

In one embodiment, the default feature variable values defined on the feature form are returned by feature variable accessors unless they are overridden by a variation in an experiment. In one embodiment, if there is a running feature test on a feature that uses a feature configuration, the feature configuration is locked until the test is paused. In various embodiments, one or more of a variable key (e.g., ID) 314, variable type (e.g., Boolean, String, Interger, Double, etc.) 315, or a default value 316 may be defined via GUI 313.

In one embodiment, the default values 316 for feature variables may be returned under the following example circumstances:

If a feature is disabled (as a safeguard to protect customers who are reference the variable even when the Feature is disabled)

As part of a feature rollout

As part of a feature test, unless the default values are overridden by a variation In another embodiment, the system may allow users to specify "rollout rules" and to vary feature variable values as part of those roles.

In one embodiment, FIGS. 3E-I are user interfaces for creating, configuring, and activating feature flags, according to one embodiment. A feature flag may be a rule to enable, disable, hide, or roll out a product feature at runtime. One benefit of a feature flag is it allows a user to configure the behavior of a product on the fly without deploying code. For example, if a company deploys a new feature behind a feature flag, they can subsequently enable it for a small group of their users and hide it for everyone else.

Figure 3E:
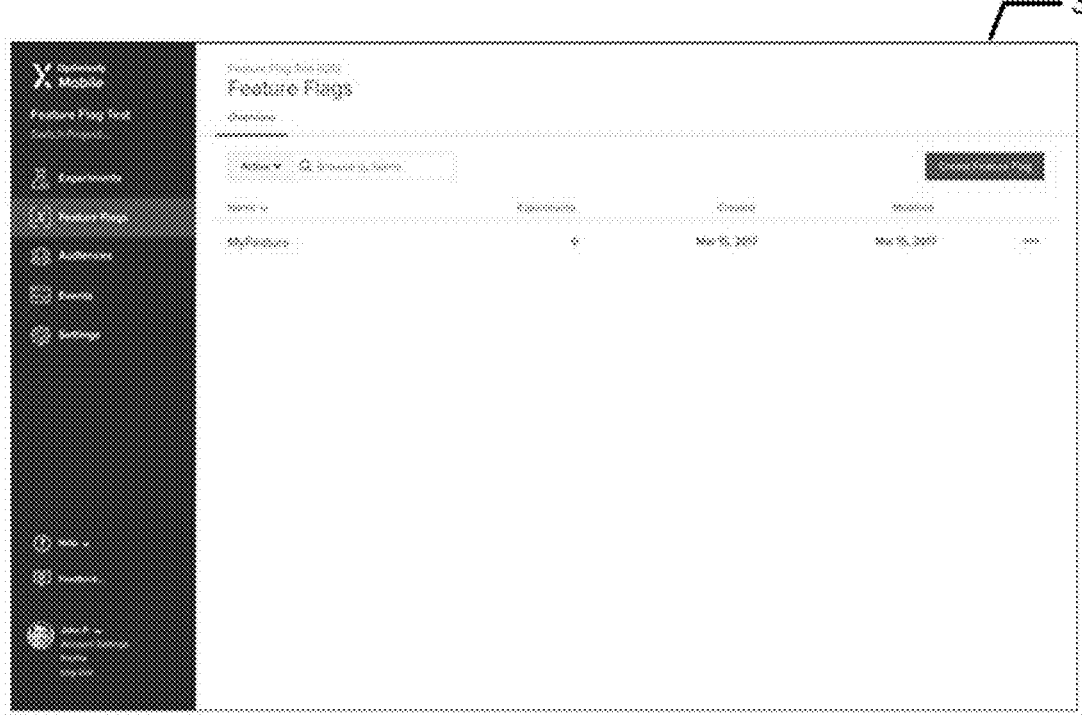
FIGS. 3E-I are user interfaces for creating, configuring, and activating feature flags, according to one embodiment.
Figure 3F:
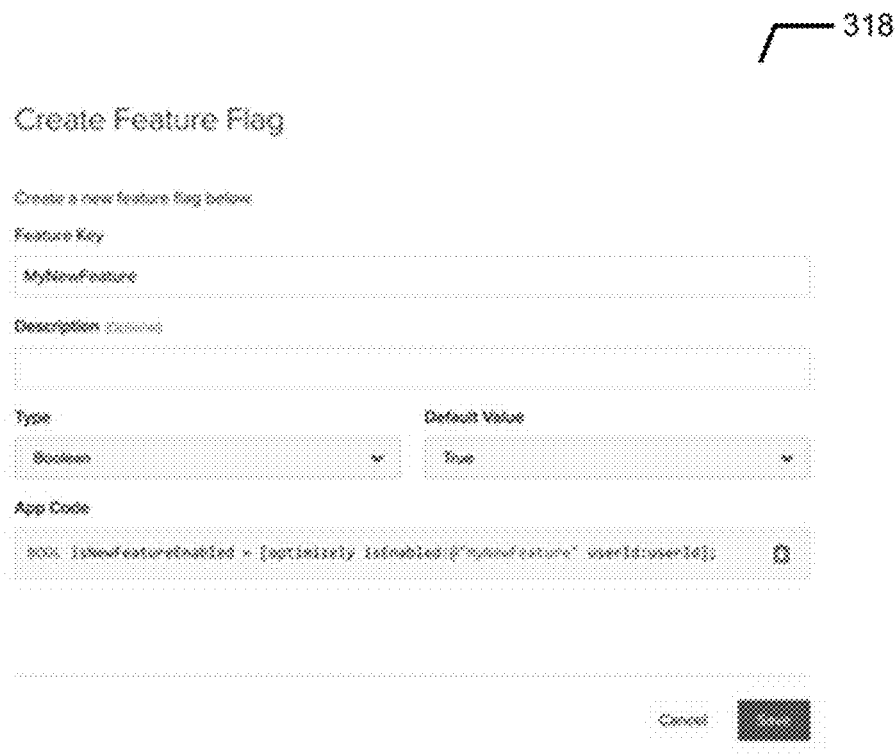
Figure 3G:
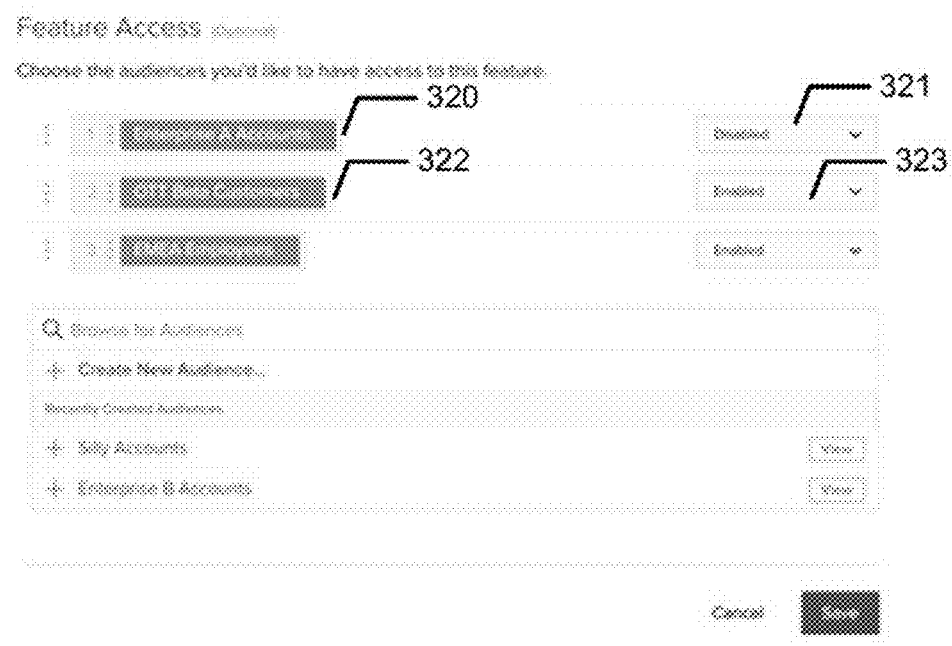
Figure 3H:
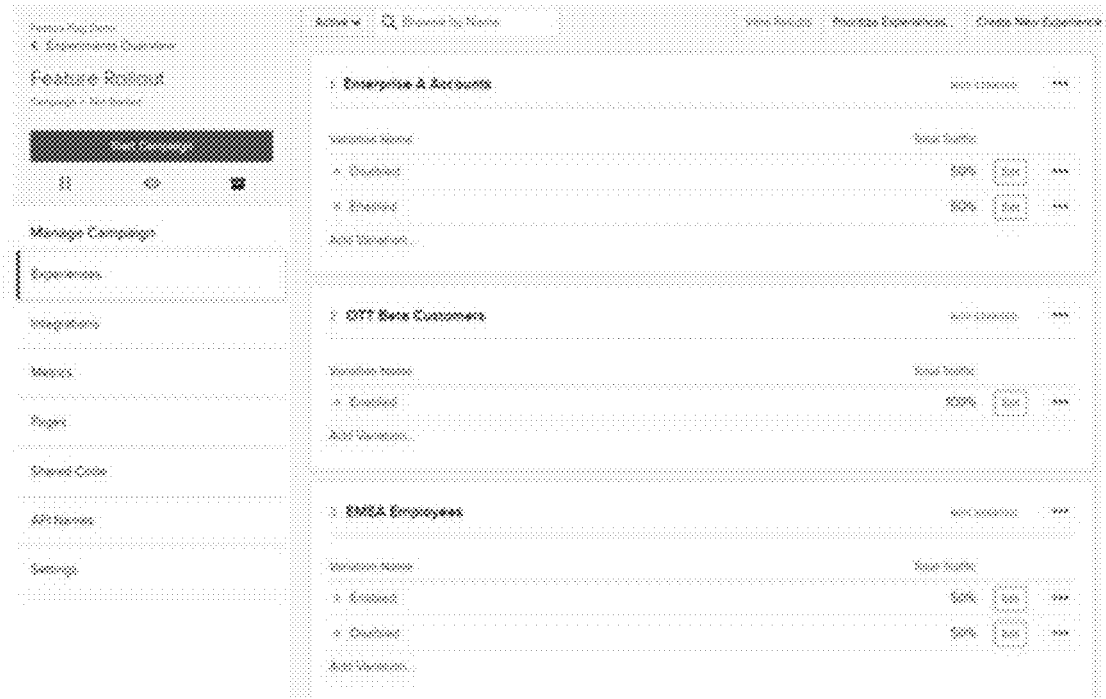

In one embodiment, existing feature flags may be displayed in GUI 317 of FIG. 3E. Creating a feature flag may look just like creating a live variable, with the four (or more) different variable types, as shown in GUI 318 of FIG. 3F. In one embodiment, feature flags can use audiences for targeting, just like experiments. For example, it is possible to map an ordered set of audiences to different feature flag values, i.e. if the user is in audience A1 they should get value V1, otherwise if they are in audience A2 they should get value V2, and so on. The GUI for such may look like GUI 319 of FIG. 3G.

For example, if a user is in an Enterprise A account 320, the feature should be disabled 321. Otherwise, if a user is an OTT Beta Customer 322, the feature should be enabled 323, etc. For other flag types (i.e. Boolean, Integer, Number, Strings, etc.) a free form text box may be provided to enter feature values. Features may be further enabled and disabled for subsets of accounts, as shown in GUI 324 of FIG. 3H. In one embodiment, features may be rolled out according to the following example logic: If the user is eligible for an experiment using feature F, get the feature value from the experiment; If the user is not eligible for an experiment, get the feature value from ordered audiences for feature F; Otherwise, use the default value for feature F.

Figure 3I:
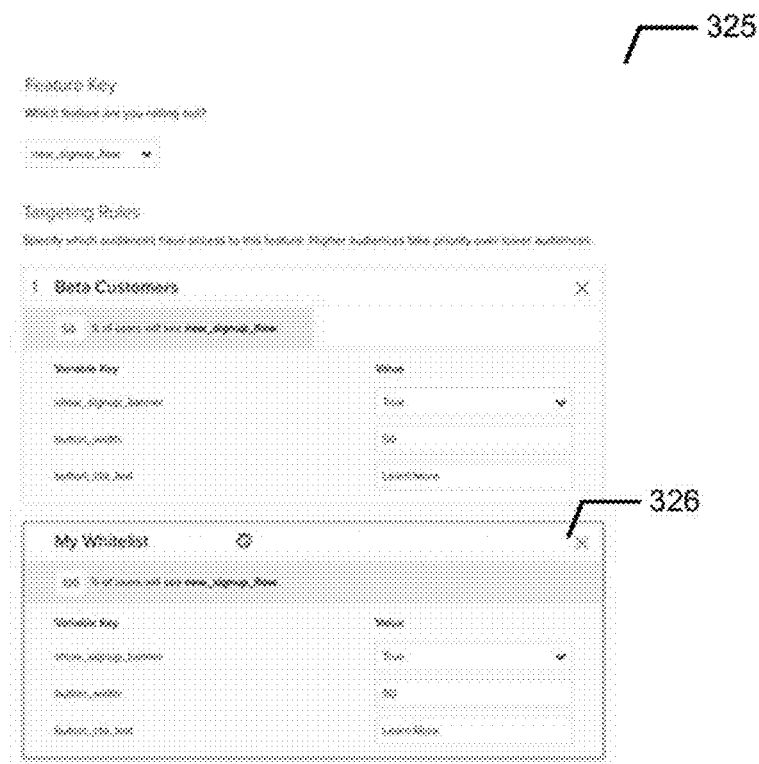

In one embodiment, as shown in GUI 325 of FIG. 3I, rollouts may have metrics describing whether a feature was used for a given customer, as that information will be available from raw data of feature access. Rollouts may include a blacklist audience listing all the IDs of people who should NOT have access to the feature. In one embodiment, there may be a special "audience" that sits atop all other targeting rules and helps enforce whitelisting behavior. In one embodiment, whitelists 326 (and blacklists) may be explicitly called out in the GUI. In one embodiment, for whitelists specifically, an Uploaded Audiences feature may be included that is essentially the same as the whitelist.

In one embodiment, rollouts may have a 1:1 relationship with a feature. They represent a set of targeting rules for a feature which are applied in order. To the end user, they will be defining audiences and enabling them for a feature. The system may create a campaign (e.g., model name layer) and create experiences (e.g., model name layer experiment) equal to the number of audiences with each experience being represented by the audience. When applying these rules to a rollout, a "variation" belonging to a layer experiment (e.g., corresponding to an audience) may result and the values associated with an audience may be stored in a feature variables model.

In one embodiment, a rollout may have a special rule called an "Everyone Else" rule. While evaluating audiences, if the user meets the audience conditions, but does not get the feature because of the traffic allocation, then all intermediate rules may be skipped and the system will directly evaluate the "Everyone Else" rule.

Figure 3J:
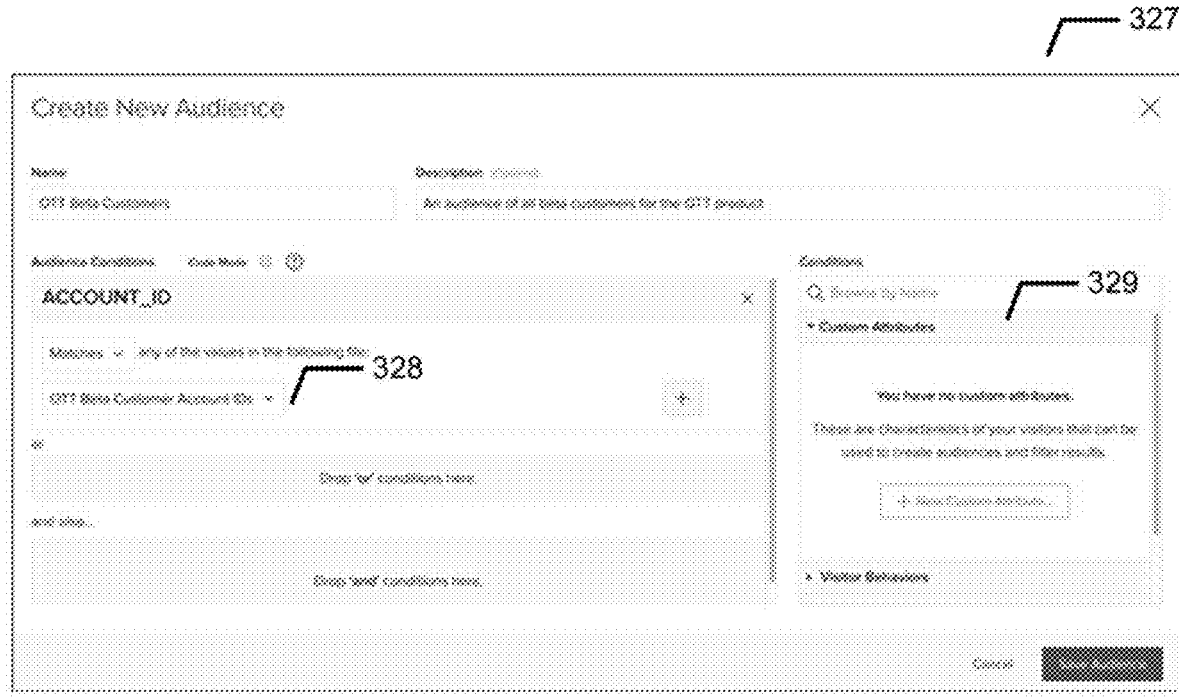
FIG. 3J is a user interface for creating a new audience, according to one embodiment.
Figure 3K:
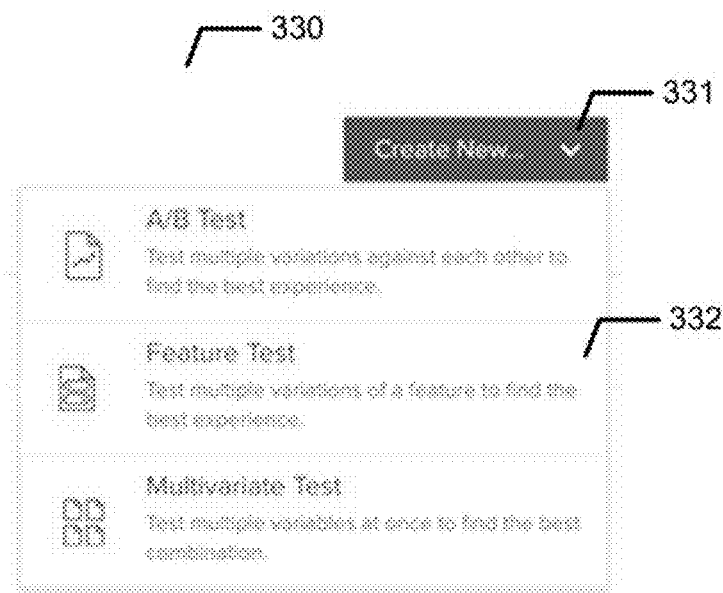

FIG. 3J is a user interface for creating a new audience, according to one embodiment. In one embodiment, GUI 327 of FIG. 3I allows customers to upload large lists of values 328 that can be used to create attribute conditions 329 in the audience builder GUI 325 (e.g., account ID can be any of the following 500 values . . . ). In one embodiment, a user ID may be passed into targeting logic as an attribute, so users can effectively create an audience used as a whitelist.

FIGS. 3K-N are user interfaces for experimenting on features, according to one embodiment. In one embodiment, GUI 330 of FIG. 3K includes a variety of experiments, including AB test, feature test, and/or multivariate test. To create a feature test, a user may select "Create New Experiment" element 331 and choose "Feature Test" 332 from the dropdown. In one embodiment, this will open a new form (GUI 333 of FIG. 3L).

Figure 3L:
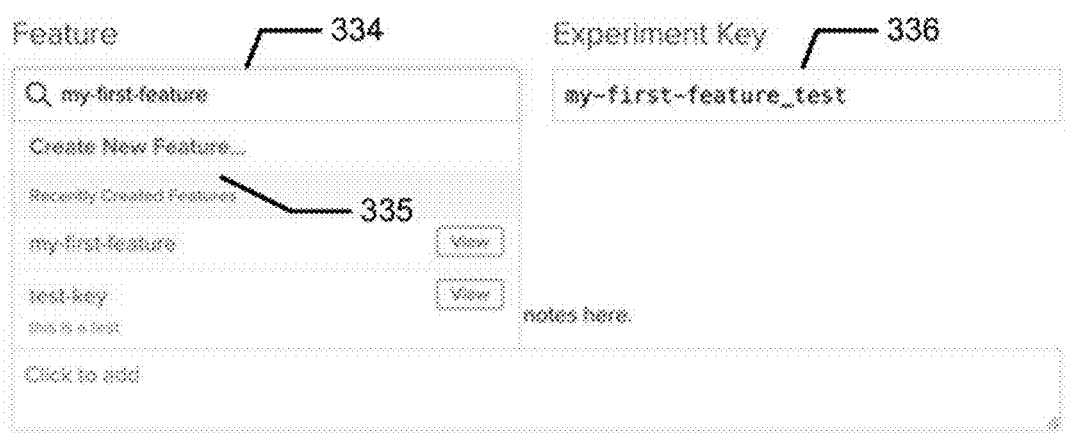
Figure 3M:
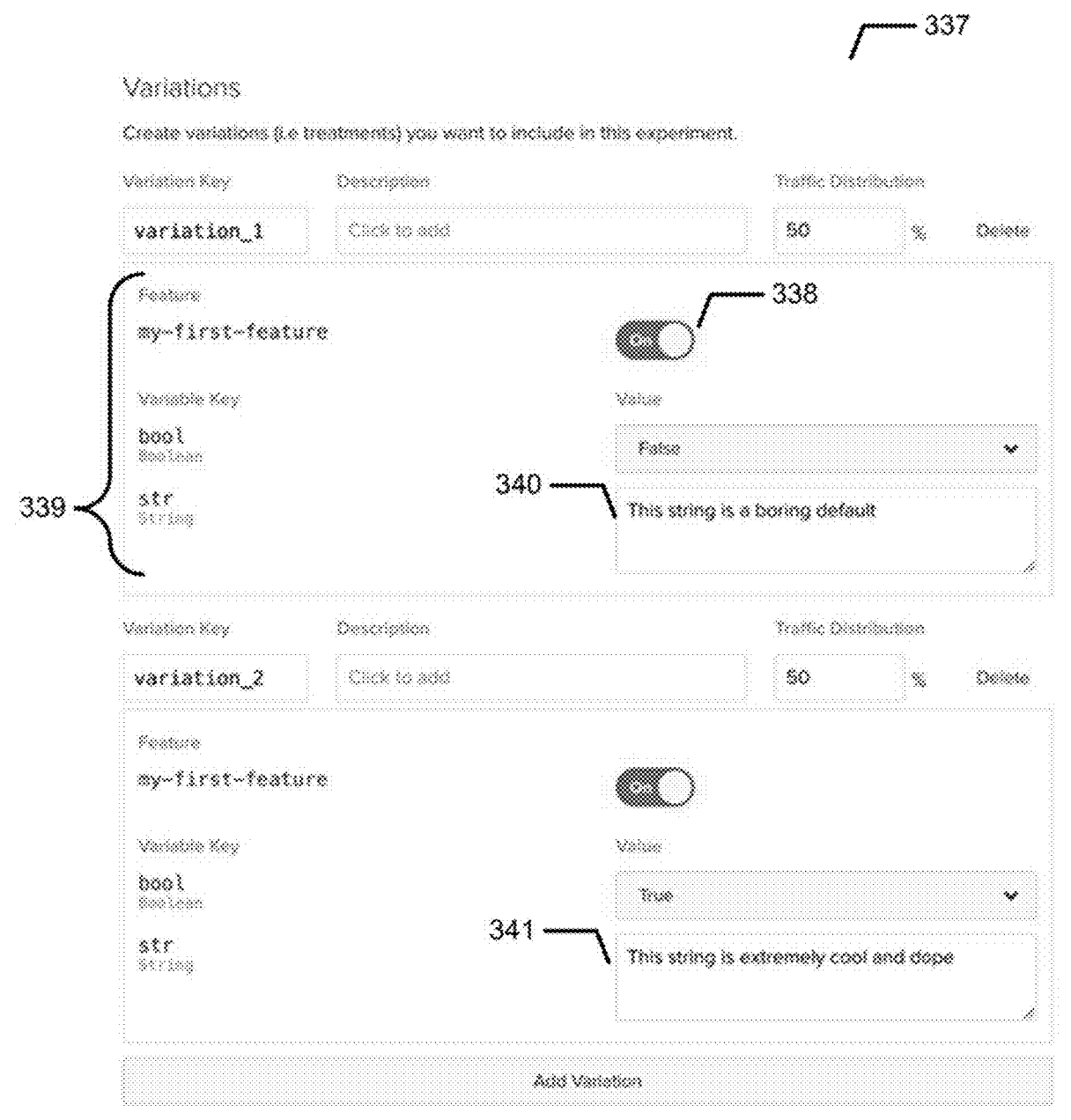
Figure 3N:
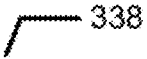
Figure 3N:
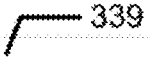
Figure 3N:
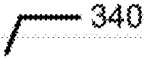
Figure 3N:
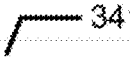

In GUI 333 of FIG. 3L, users may use a searchable text field 334 to choose an existing feature, or can create a new feature 335 before creating a test. Once the user chooses a feature (or creates a new one), the system may automatically generate an experiment key 336 by appending "test" to the end of the feature key. In one embodiment, this experiment key is editable. In the event there is already a feature test that uses the automatic experiment key, the system may will append "_test1," "_test2\," etc.

In one embodiment, feature tests may automatically suggest variation keys. By default, the system may provide two variations with keys "variation_1" and "variation_2." Like experiment keys, variation keys may be editable. If the user adds additional variations, the system may provide automatic suggestions according to the variation number: "variation 3," "variation 4," etc. If the user deletes a variation the system may continue incrementing as though the deleted variation still exists.

In one embodiment, feature test variations may expose a feature toggle 338 and the feature's configuration 339 (if one exists), as shown in GUI 337 of FIG. 3M. By default, the toggle 338 may be set to "on" and the configuration 339 will load its default value(s) 340. In one embodiment, a feature may not include a configuration, so a fature test may be run by testing one variation consisting of "Toggle=on" and another variation consisting of "Toggle=off." If a feature includes a feature configuration, and if the user sets a variation to "Toggle=off," the system may disable the option to modify variable values and may revert to the default variable values.

Advantageously, the embodiments provided herein allow for the ability to run experiments on features that include feature configurations—users are be able to initialize their applications with features and feature configurations, then run unlimited numbers of experiments without having to perform code redeploys. To create variations using feature configurations, a user may update the variable values (e.g., 340, 341) under each variation on the GUI 337. In one embodiment once the experiment is live, an application programming interface (API) may return the values specified for the variation assigned to a user In one embodiment, if there exists feature tests for a feature, the feature form (e.g., GUI 338) may provide information about those tests. For example, for an experiment running on a feature GUI 338 may provide one or more of:
  An Experiment Key 339: unique identifier for the experiment; links to the Experiment Form
  A Type 340: to start, this will always be "Feature Test", but will include MVT and potentially other types in the future
  A Status 341: Draft/Running/Paused In one embodiment, feature tests take precedence over feature rollouts. In other words, if both a feature test and feature rollout are active, the feature test is evaluated first. If a user does not qualify for the feature test, the feature rollout is evaluated. To illustrate how this might work in practice, the following hypothetical describes possible outcomes:
Scenario:
  Feature Test running with an Audience and a Traffic Allocation
  Feature Rollout running with an Audience and a Traffic Allocation
Acronyms
FTA=Feature Test Audience
FTT=Feature Test Traffic Allocation
FRA=Feature Rollout Audience
FRT=Feature Rollout Traffic Allocation

| User | FTA | FTT | FRA | FTT | Result |
|------|------|------|------|------|--------|
| user1 | passes | passes | n/a | n/a | Feature Test |
| user2 | passes | fails | passes | passes | Feature Rollout |
| user3 | fails | n/a | passes | passes | Feature Rollout |
| user4 | fails | n/a | passes | fails | No action |
| user5 | fails | n/a | fails | n/a | No action |

In one embodiment, users may be allowed a maximum of one running production feature test at a time, unless the feature is assigned to a mutually exclusive group. Users may be allowed multiple draft, paused, and archived experiments on a feature. If a user tries to launch a second feature test, on while another feature test is running, the system may warn the user that a maximum of one feature test is allowed at a time (unless the experiments are mutex). In one embodiment, mutually exclusive groups may allow users to run concurrent production feature tests. In the event that there are feature tests running in a mutex group, evaluating the users mutex group becomes the first step in the order of operations. Once the mutex group is assigned, the system may evaluate feature tests and rollouts according to the same rules described above.

In one embodiment, anyone may create a feature. Likewise, anyone may create and enable feature rollouts and feature tests in non-production environments. IN another embodiment, only Admins, Project Owners, and Publishers can enable feature rollouts and feature tests in production.

In one embodiment, feature toggles may be added to feature rollouts and make toggles compatible with environments:
  Feature Dashboard
    Environment-specific Feature Toggles
  Feature Form
    Add Environment-specific Feature Toggles
Other features of the system described herein may include:
  Cleaning up Features: Provide the ability to track when the code used to launch a feature should be removed
  Rollout Results: Provide results specifically designed to address the "gradual rollout to mitigate risk" use case. These may deviate from traditional AB test results. For example, rollout results may measure sample populations that change as traffic allocations change, and would be designed to measure "not worse" by default, rather than "is better."
  Advanced Targeting, Whitelisting & Blacklisting: Improve audience targeting to allow customers to define types of audiences that aren't well support today. For example, add the ability to match attributes using operators like "list includes" or "matches regex"; add the ability to provide typed attributes like integers or dates; add the ability to specify lists of user IDs to whitelist or blacklist for a rollout or feature test
  Advanced Rollout Rules: Provide the ability to specify different feature configurations for different audiences.

In one embodiment, the third-party content provider may connect a website (or other digital content) to the experimentation platform using, e.g., an API. This connection may occur locally or via a network. The connection permits the experimentation platform and website server(s) to communicate. In one embodiment, code on the website may be configured to check the feature flags that have been configured on the experimentation platform before loading a web page on the client device. The experimentation platform may use the connection to control the logic that determines whether or not to deploy a feature on the web page. In some embodiments, the experimentation platform may also control which features variables to deploy (e.g., depending on a scenario or a group of users). In various embodiments, features, feature variables, and/or feature variable values are created and sent from a third-party content creator, and received by processing logic of the systems described herein (e.g., via the connection established between the experimentation platform and the website server(s)).

As an illustrative example of the setup process described herein, after connecting its website to the experimentation system as discussed above, a content provider may create code for a feature, such as a new sign-in form for the website (the "feature"). The code for the feature includes a unique feature key that permits that feature to be identified. The code includes a placeholder variable that serves a placeholder for text for the sign-in banner (e.g. "Sign in here"). The experimentation system, using the user interface described in FIG. 3A, may allow configuration of a feature flag associated with the feature. The configuration includes the unique feature key that matches the feature key for the feature on the website. The content provider configures a rule on the experimentation system to determine when and to whom the new sign-in feature should be deployed (e.g., use the new form with 40% of website visitors, else use old sign-in form). The content provider can also set up variables (e.g., feature variables) on the experimentation systems with different variations of the sign-in banner text (e.g. "Welcome San Francisco people" and "Welcome! Thank you for using Firefox"). Those variables may be associated with audiences who will receive the variation (e.g., people in San Francisco and people who use Firefox). Variables can also be triggered based on other scenarios (e.g. time-of-day, etc.).

When a client device connects to the content provider's website (or other digital content), the client device makes a request for a web page (or other digital content) that may optionally include the new sign-in form. The code on the web site checks with the experimentation platform to determine whether the client device should receive the new sign-in form. Using the configurations discussed above, the experimentation platform directs the web site whether to deploy the new sign in form to the client device. In further embodiments, the experimentation platform determines which of the different variations of the sign-in banner text to deploy to the particular client device. Once the determination is made, the experimentation platform sends the applicable sign-in banner text to the web site, which inserts the text in place of the feature variable discussed above. The web server may then send the web page with the new feature and feature variable variation (e.g., value) to the client device.

In one embodiment, the selection of the sign-in banner text (e.g., the feature variable value) is made randomly. In other embodiments, the selection and depends on the characteristics of the client device, such as geographic location of the client device. In still other embodiments, the selection is made based on data gathered about the user of the client device.

In further embodiments, the web site sends data to the experimentation platform regarding whether a client device who sees the sign in banner text variation actually proceeds to log into the website. The experimentation platform can aggregate this data and determine which of the banner text variations leads to more log ins to the website.

In one embodiment, the feature variable value consists of a text string. In other embodiments, the feature variable value can consist of Boolean values, integers, double, data objects, images, videos, and other content.

One advantage of the above is that the content provider does not have to change the actual code of the feature (e.g., go into their code base to change the banner text from default text to the San Francisco User text, as described in the above example). The content provided can instead do this by setting up variables in the experimentation system. Worth noting, banner text is one example of a feature variable, but there are several other applications.

Figure 4A:
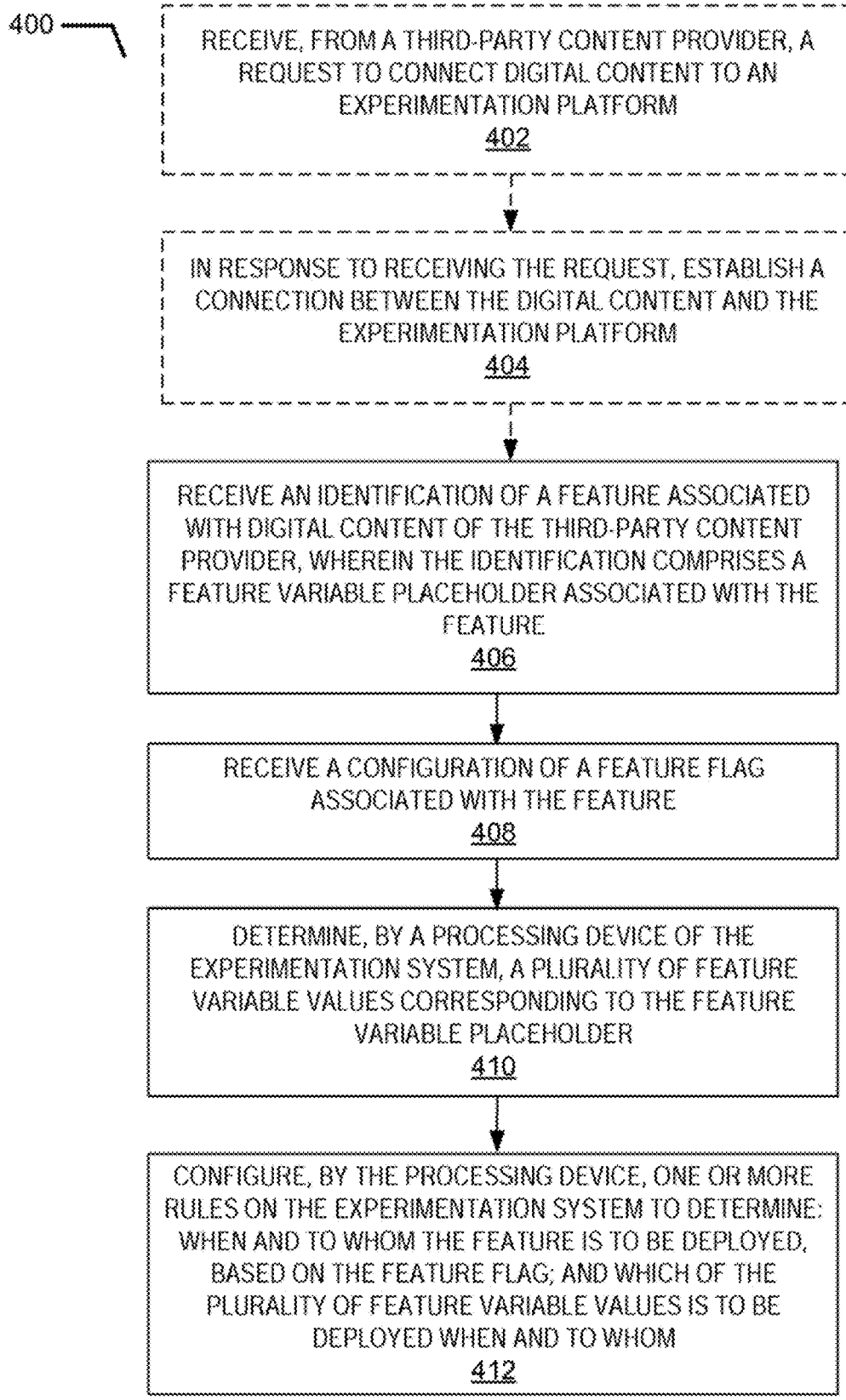
FIG. 4A is a first flow diagram of a method of using server-side configuration variables in feature testing on web pages or digital products, in accordance with some embodiments of the present disclosure.

FIG. 4A is a first flow diagram of a method of using server-side configuration variables in feature testing on web pages or digital products, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by system 100 of FIG. 1.

The method 400 begins at block 402, in which processing logic optionally receives, e.g., from a third-party content provider, a request to connect digital content to an experimentation platform. As described herein, digital content may include web pages, software applications (e.g., including web applications, mobile applications, etc.), and any other form of digital content that may be provided to a user.

In response to receiving the request at block 402, processing logic may optionally establish a connection between the digital content and the experimentation platform at block 404. At block 406, processing logic receives an identification of a feature (e.g., code representing the feature) associated with digital content of the third-party content provider. In one embodiment, the identification of the feature includes a unique identifier of the feature. In one embodiment, the identification includes a feature variable placeholder (e.g., code representing the feature variable placeholder) associated with the feature. At block 408, processing logic receives a configuration of a feature flag associated with the feature. In one embodiment, the feature flag includes the unique identifier of the feature.

In one embodiment, the identification of the feature and/or the configuration of the feature flag are received via the connection established at block 404. In other embodiments, other suitable local or nonlocal network connections may be utilized. The request may be received via an application programming interface (API) associated with the experimentation platform.

At block 410, processing logic determines, by a processing device of the experimentation system, a plurality of feature variable values corresponding to the feature variable placeholder. At block 412, processing logic may configure, by the processing device, one or more rules on the experimentation system to determine: when and to whom the feature is to be deployed, based on the feature flag; and/or which of the plurality of feature variable values is to be deployed when and to whom.

Figure 4B:
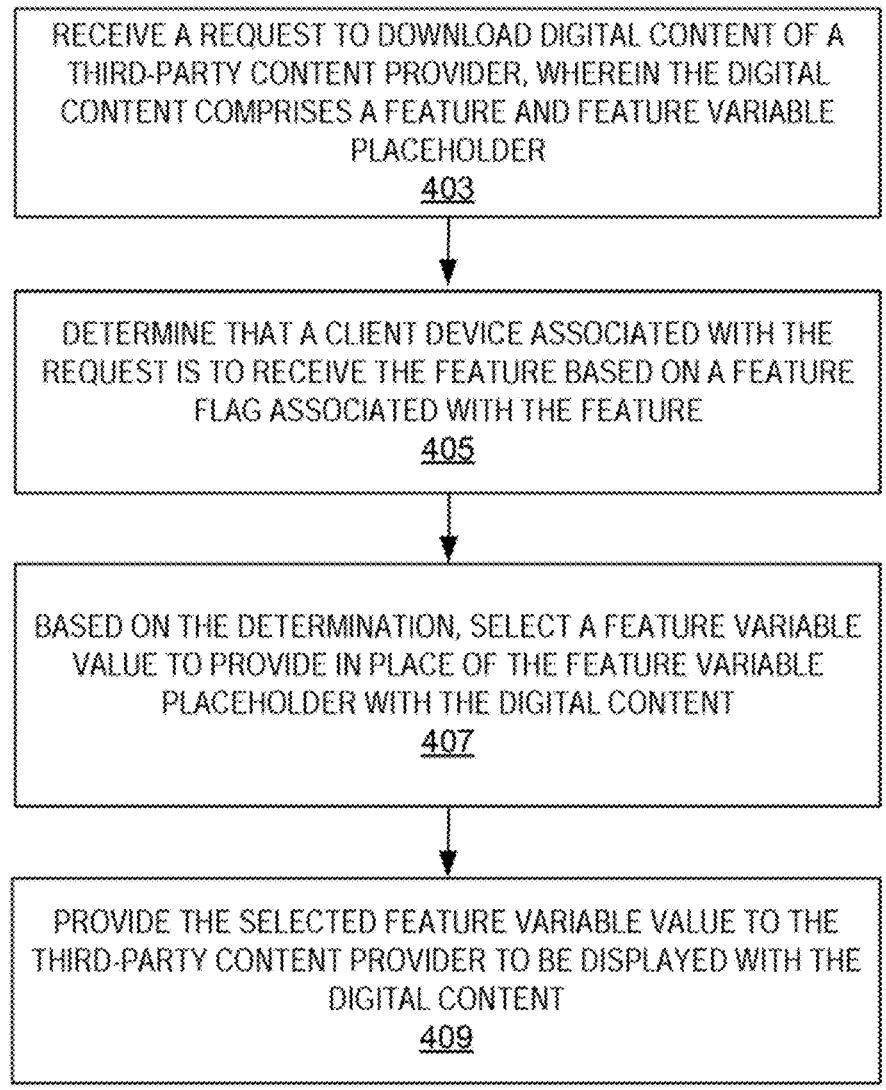
FIG. 4B is a second flow diagram of a method of using server-side configuration variables in feature testing on web pages or digital products, in accordance with some embodiments of the present disclosure.

FIG. 4B is a second flow diagram of a method of using server-side configuration variables in feature testing on web pages or digital products, in accordance with some embodiments of the present disclosure. Method 401 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 401 may be performed by system 100 of FIG. 1.

The method 401 begins at block 403, in which processing logic receives a request to download digital content of a third-party content provider, wherein the digital content comprises a feature and feature variable placeholder. At block 405, processing logic determines that a client device associated with the request is to receive the feature based on a feature flag associated with the feature.

Based on the determination, processing logic at block 407 selects a feature variable value to provide in place of the feature variable placeholder with the digital content. In one embodiment, the selected feature variable value is selected randomly (e.g., non-deterministically, pseudo-randomly, etc.) from a plurality of feature variable values (e.g., provided by the third-party content provider, or default variables provide by the experimentation platform). In another embodiment, the selected feature variable value is selected based on one or more characteristics of the client device (e.g., a geographic location of the client device). In yet another embodiment, the one or more characteristics may include information associated with a user of the client device (e.g., demographic and/or activity/interaction data collected by the third-party content provider and/or the experimentation platform). In one embodiment, the feature variable value includes one or more of: a text string, a Boolean value, an Integer, a Double, a data object, an image, or a video.

At block 409, processing logic provides the selected feature variable value to the third-party content provider to be displayed with the digital content. In one embodiment, processing logic may further receive data identifying how a user interacted with the digital content and select, based on the data, a new feature variable value to be provided instead of the feature variable placeholder in the future.

Figure 5:
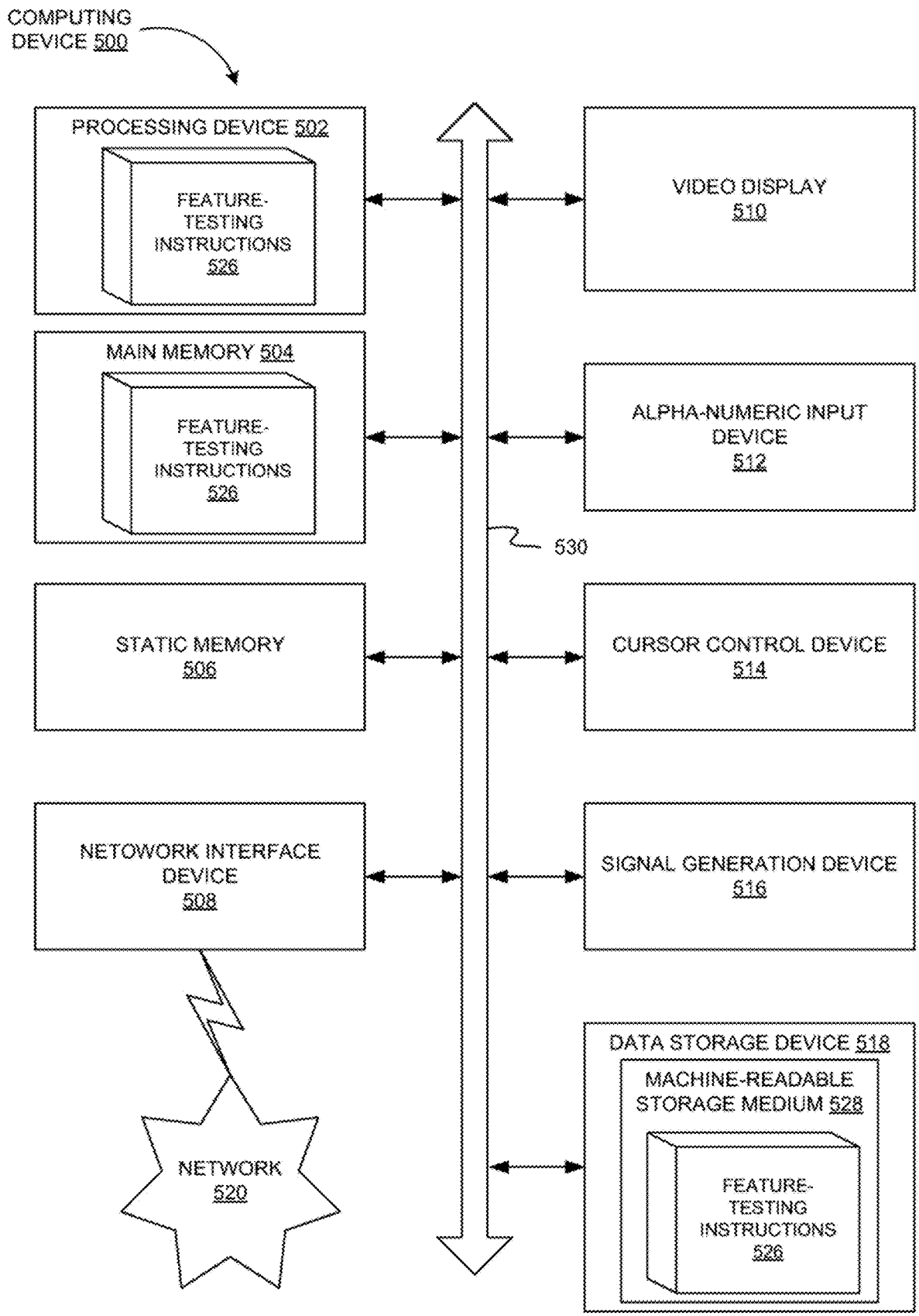
FIG. 5 is a block diagram of an example apparatus that may perform one or more of the operations described herein, in accordance with some embodiments The figures depict an embodiment for purposes of illustration only. One skilled in the art will readily recognize from the following description that alternative embodiments of the structures and methods illustrated herein may be employed without departing from the principles described herein.

FIG. 5 is a block diagram of an example computing device 500 that may perform one or more of the operations described herein, in accordance with some embodiments. In various embodiments, computing device 500 may represent computing devices (e.g., servers) of the experimentation platform, third-party content provider client devices, and/or third-party content provider servers. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions, e.g., instructions for carrying out the operations described herein, in accordance with one or more aspects of the present disclosure. Feature-testing instructions 526 may also reside, completely or at least partially, within main memory 504 and/or within processing device 502 during execution thereof by computing device 500, main memory 504 and processing device 502 also constituting computer-readable media. The instructions may further be transmitted or received over a network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving an identification of a feature associated with digital content of a third-party content provider, wherein the identification comprises a feature variable placeholder associated with the feature;
    receiving a configuration of a feature flag associated with the feature;
    determining, by a processing device of an experimentation system, a plurality of feature variable values corresponding to the feature variable placeholder, wherein each of the plurality of the feature variable values comprises a different variation of a portion of the digital content; and
    configuring, by the processing device, one or more rules on the experimentation system to determine:
    when and to whom the feature is to be deployed, based on the feature flag; and
    which of the plurality of feature variable values is to be deployed when and to whom.

2. The method of claim 1, further comprising:
    receiving, from the third-party content provider, a request to connect the digital content to an experimentation platform; and
    in response to receiving the request, establishing a connection between the digital content and the experimentation platform.

3. The method of claim 2, wherein the identification is received via the connection.

4. The method of claim 2, wherein the request is received via an application programming interface (API) associated with the experimentation platform.

5. The method of claim 2, wherein the connection is a local connection.

6. The method of claim 2, wherein the connection is a nonlocal network connection.

7. The method of claim 1, wherein the identification of the feature comprises a unique identifier of the feature.

8. The method of claim 7, wherein the feature flag comprises the unique identifier of the feature.

9. The method of claim 1, wherein the digital content is a web page or a software application.

10. An apparatus, comprising:
    a memory to store state information;
    a processing device operatively coupled to the memory, the processing device to:
    receive a request to download digital content of a third-party content provider, wherein the digital content comprises a feature and a feature variable placeholder associated with the feature;
    determine that a client device associated with the request is to receive the feature based on a feature flag associated with the feature;
    based on the determination, select a feature variable value of a plurality of feature variable values to provide in place of the feature variable placeholder with the digital content, wherein each of the plurality of the feature variable values comprises a different variation of a portion of the digital content; and provide the selected feature variable value to the third-party content provider to be displayed with the digital content.

11. The apparatus of claim 10, wherein the selected feature variable value is selected randomly from the plurality of feature variable values.

12. The apparatus of claim 10, wherein the selected feature variable value is selected based on one or more characteristics of the client device.

13. The apparatus of claim 12, wherein the one or more characteristics comprise a geographic location of the client device.

14. The apparatus of claim 12, wherein the one or more characteristics comprise information associated with a user of the client device.

15. The apparatus of claim 10, wherein the processing device is further to:

select a new feature variable value of the plurality of feature variable values to be provided instead of the feature variable placeholder in the future based on data identifying how a user interacted with the digital content.

16. The apparatus of claim 12, wherein the feature variable value comprises one or more of: a text string, a Boolean value, an Integer, a Double, a data object, an image, or a video.

17. The apparatus of claim 12, wherein the digital content is a web page or a software application.

18. A non-transitory computer-readable storage medium including instructions that, when executed by a processing device, cause the processing device to:

receive a request to download digital content of a third-party content provider, wherein the digital content comprises a feature and a feature variable placeholder associated with the feature;

determine that a client device associated with the request is to receive the feature based on a feature flag associated with the feature;

based on the determination, select, by the processing device, a feature variable value of a plurality of feature variable values to provide in place of the feature variable placeholder with the digital content, wherein each of the plurality of the feature variable values comprises a different variation of a portion of the digital content; and provide the selected feature variable value to the third-party content provider to be displayed with the digital content.

19. A non-transitory computer-readable storage medium of claim 18, the processing device further to select a new feature variable value of the plurality of feature variable values to be provided instead of the feature variable placeholder in the future based on data identifying how a user interacted with the digital content.

20. The non-transitory computer-readable storage medium of claim 18, wherein the digital content is a web page or a software application.

* * * * *